(12) United States Patent
Harper

(10) Patent No.: US 6,723,261 B2
(45) Date of Patent: Apr. 20, 2004

(54) PRODUCTION OF COMPOSITE MOULDINGS

(76) Inventor: AlanRoger Harper, Unit One, Delaware Road, Gunnislake, Cornwall PL18 9AR (GB)

( * ) Notice: Subject to any disclaimer, the term of this patent is extended or adjusted under 35 U.S.C. 154(b) by 122 days.

(21) Appl. No.: 09/941,134

(22) Filed: Aug. 28, 2001

(65) Prior Publication Data
US 2002/0030294 A1 Mar. 14, 2002

(30) Foreign Application Priority Data
Sep. 9, 2000 (GB) .............................................. 0022119

(51) Int. Cl.⁷ .............................................. B29C 41/52
(52) U.S. Cl. ..................... 264/40.1; 264/40.7; 264/257; 264/328.1; 425/135; 425/145; 425/147; 425/150
(58) Field of Search ............................. 264/40.1, 40.3, 264/40.7, 257, 328.1; 425/135, 145, 147, 150

(56) References Cited

U.S. PATENT DOCUMENTS

| 3,976,415 A | * | 8/1976 | Hauser et al. ............... 425/145 |
| 4,120,922 A | * | 10/1978 | Lemelson .................. 264/40.7 |
| 4,824,351 A | | 4/1989 | Ramsey |
| 5,472,331 A | * | 12/1995 | Watkins et al. .............. 425/149 |
| 5,516,271 A | * | 5/1996 | Swenor et al. ............... 425/127 |
| 6,136,236 A | * | 10/2000 | Boccard et al. ............. 264/40.1 |
| 6,143,215 A | * | 11/2000 | McCollum et al. ......... 264/40.1 |
| 6,294,122 B1 | * | 9/2001 | Moss et al. ............... 264/328.9 |

FOREIGN PATENT DOCUMENTS

| GB | 1 436 338 | | 5/1976 |
| JP | 57-127560 | * | 8/1982 |

* cited by examiner

Primary Examiner—Stefan Staicovici
(74) Attorney, Agent, or Firm—Melvin I. Stoltz

(57) ABSTRACT

A closed mould method of producing composite mouldings is provided. A sensor system (4, 5, 6, 7, 8) is provided for sensing distortion of one (1) of the mould elements while the resin mix is being fed into the mould cavity. A signal is generated if a predetermined degree of distortion is sensed.

4 Claims, 4 Drawing Sheets

PRODUCTION OF COMPOSITE MOULDINGS

FIELD OF THE INVENTION

This invention relates to the production of composite mouldings.

The composite industry is commonly known as the grp (glass-reinforced plastics) industry, or the frp (fibre-reinforced plastics) industry and encompasses the production of composite mouldings for a large number of sectors of industrial application. These include the automotive, bus and truck, marine and aerospace industries. In these sectors, many composite moulded parts will have surface areas well in excess of 1 square meter. For example, a boat moulding could have a surface area within the range of from 10 to 1000 square meters.

The production of composites involves the use of two basic raw materials. One is a thermosetting liquid resin and the other is a fibre (usually a glass fibre). The traditional method of manufacture has involved laying the two materials in an open mould and consolidating them manually to the desired moulding thickness.

As a result of ever-increasing global legislation demanding reduction in hazardous conditions and dust, and general improvements in working conditions, the open moulding of composite parts is on the decline in favour of closed mould production methods. In these, a matched pair of moulds is employed to create a cavity between them such that, when the two moulds are held in closed registration, the defined cavity faithfully represents the shape and thickness of the desired mould part.

Closed mould sets vary within the industry, ranging from heavy duty rigid mould sets, which are designed to withstand high compression or resin injection pressures, to thin closed mould sets which are designed to be held together with the aid of vacuum within their cavities.

The large surface areas of these mould sets create manufacturing problems, i.e. it is difficult to maintain the required tolerance of part thickness and shape.

It is accordingly an object of the present invention to provide an improved method of making composite mouldings. It is also an object of the present invention to provide an improved form of composite closed mould production facility.

SUMMARY OF THE INVENTION

According to a first aspect of the present invention there is provided a method of making a composite moulding which includes:

providing a pair of mould elements which define a mould cavity, introducing reinforcing fibre into the mould cavity, feeding a resin mix into the mould cavity, providing means for sensing distortion of a mould element and generating an output signal when a predetermined degree of distortion is sensed, and controlling the rate at which the resin mix is introduced into the mould cavity in dependence on said output signal.

According to a second aspect of the present invention there is provided a composite closed mould production facility which includes:

a pair of mould elements which define a mould cavity into which reinforcing fibre can be introduced, means for feeding a resin mix into the mould cavity, means for sensing distortion of a mould element, means for generating an output signal when a predetermined degree of distortion is sensed, and control means for controlling the rate at which the resin mix is introduced into the mould cavity in dependence on said output signal.

DESCRIPTION OF THE PREFERRED EMBODIMENTS

Figure 1:
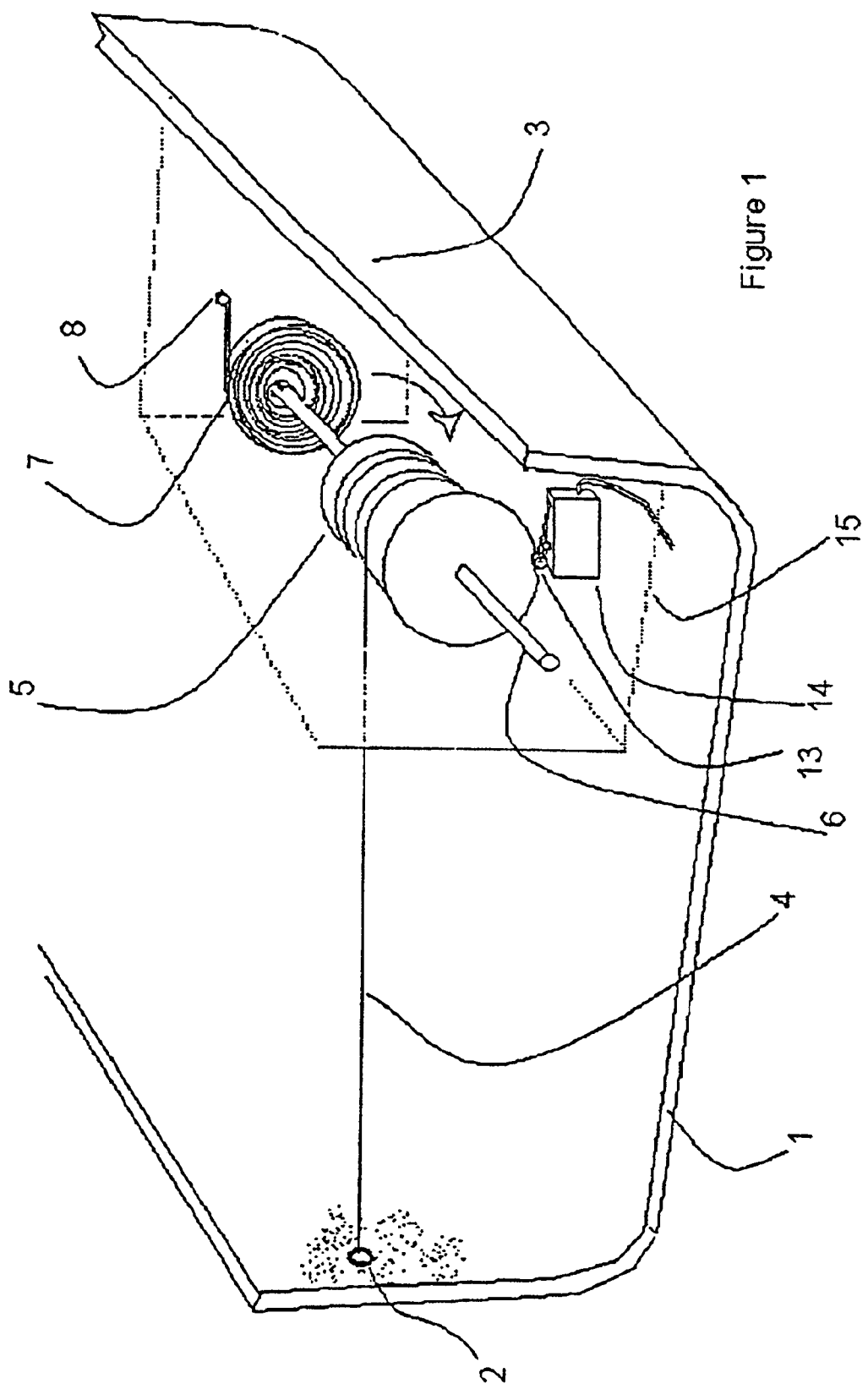
FIG. 1 is a diagrammatic perspective view of an inner mould element fitted with a first form of sensor system.

As shown in FIG. 1, an inner mould element 1 has a moulding surface 3 which represents the inner surface half of a matched mould pair. For convenience, the outer mould element has not been shown in the drawings. It will be appreciated that the spacing between the inner and outer mould elements determines the thickness of the formed composite moulding and that the configurations of the inner and outer mould elements determine the configuration of the formed composite moulding.

An anchor point 2 is provided on the inner surface of the inner mould element 1 and one end of a spring-retractable sensor lead 4 is attached to the anchor point 2. The opposite end of the sensor lead 4 is anchored to a spring-loaded cylindrical drum 5. A shaft 6 supported by bearings (not shown) provides a connected drive for the drum 5. A coil spring 7 is fixed to the shaft 6 and provides a clockwise torsion to the drum 5 so that the lead 4 is maintained in tension. The coil spring 7 is attached at its one end to the shaft 6 and has its other end anchored at 8 to a chassis 15 contained within the inner mould element and indicated in outline in FIG. 1. A limit switch 14 having an armature 12 is provided with a spring-loaded lever and cam follower assembly 13.

Figure 2A:
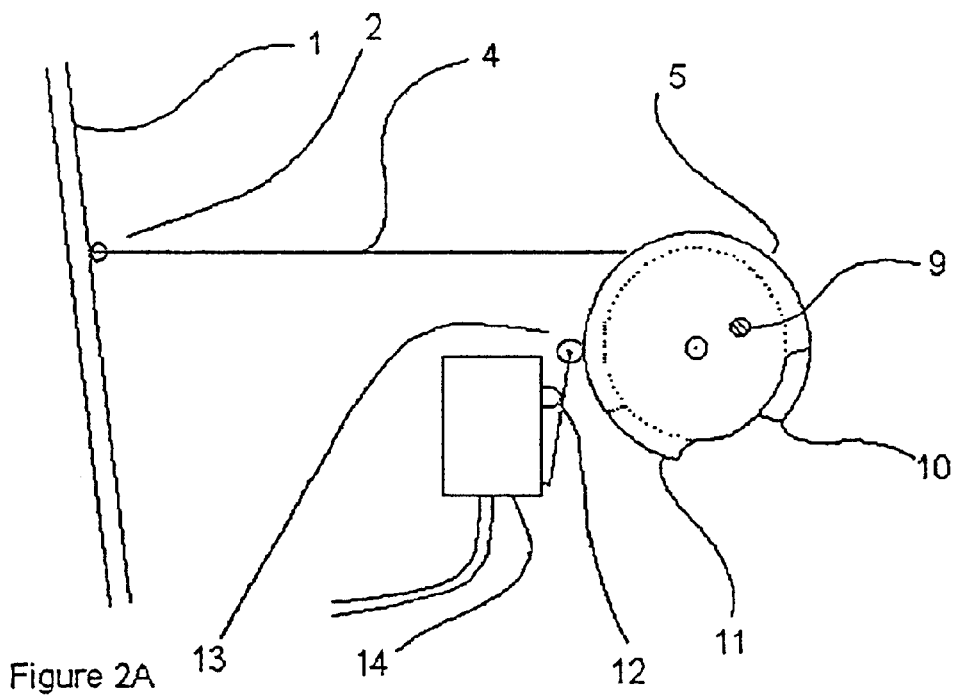
FIG. 2A shows the sensor system of FIG. 1 with the inner mould element in an undeflected condition.

The drum 5 carries a pair of cam segments 10 and 11, and FIG. 2A shows the situation which is obtained in the undeflected state of the inner mould element 1. Thus the switch 14 is positioned radially so that its lever 13 is compressed as a result of engagement with the outer surfaces of the cam segments 10 and 11. The switch armature 12 is depressed and thus provides an indication that the sensor system is in a steady state, i.e. a non-trigger point, and that the wall of the inner mould element is in its designed, non-deformed state. The positions of the cam segments 10 and 11 on the drum 5 are adjustable so as provide an adjustable cam profile gap. Once set in the required positions, the cam segments 10 and 11 are locked in position by means of a locking screw 9.

Figure 2B:
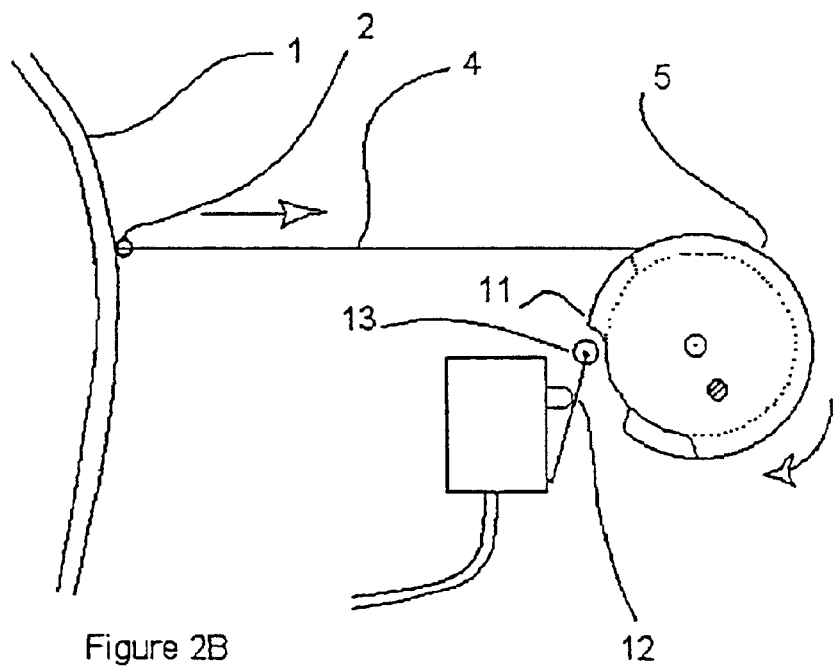
FIG. 2B shows the sensor system of FIG. 1 with the inner mould element in a deflected condition.

FIG. 2B shows the wall of the inner mould element 1 deflected inwardly with the anchor point 2 moving in the same direction and by the same amount. The sensor lead 4 therefore retracts onto the drum 5 and allows the drum 5 to rotate clockwise by an extent such that a point on the circumference of the drum 5 moves circumferentially through a distance equal to the lead shortening distance. The switch lever 13 moves into the gap between the profiles of the cam segments 10 and 11 and triggers switch 14.

In use of the system described above, dry fibre in deformable sheet form is placed onto one surface of the mould set. The contra, matching mould is then placed over the first mould so as to close the mould cavity. The inner and outer moulds are clamped together with the aid of vacuum, which is sealed by peripheral mould seals.

Mixed resin and hardener is then pressure fed into the mould cavity by way of a mould port or ports (not shown) strategically positioned in the surface of one of the mould elements. The resin continues to flow through the permeable mould fibre pack until the mould cavity is completely filled.

Unless the resin fill of the mould cavity is velocity and pressure controlled within the limits of mould strength and efficient production, problems of accuracy of the moulded component will occur or there will be a reduced output rate. For example, a pressure or velocity set too high will deflect the mould surfaces apart creating poor or incomplete fill and an increase in thickness of the moulded component. Similarly, a pressure or velocity set too low will reduce production output and may result in there being too little time to fill the mould before the resin mixture begins to react and harden.

Use of the sensor system described above thus provides a signal from the mould surface to indicate the amount of mould deflection from the desired dimensions. The signal is transmitted to a control box containing means for controlling the pressure and velocity of the resin being fed to the mould cavity. This in turn provides an automatic and safe optimised level of production control by either reducing or increasing their output levels.

It will be appreciated that more than one sensor may be provided and that the different sensors will act on different positions of the chosen mould element, and that sensors may be arranged to act on both mould elements.

The particular arrangement shown in FIGS. 1, 2A and 2B can readily be set up on any size of mould surface by appropriate adjustment of the initial length of the drum reel lead. The switch 14 is designed to be adjustable radially about the axis of the drum 5 to allow for initial setting of the trigger point, i.e. once the drum chassis 15 has been fixed in position and the lead anchor point 2 has been attached to the selected part of the mould surface, the switch 14 is rotated and locked into a radial position such that a small shortening of the lead 4 due to inward deflection of the mould 1 will trigger the switch lever 13 and provide the controlling signal to stop or reduce the rate of resin mix flow to the mould cavity.

The lead 4 may have additional threaded fixed guide, low friction or roller eyelet points on one or more mould surfaces through which the lead 4 may also pass in sequence between the anchor point 2 and the sensor assembly. This provides multiple sensing of mould surface deflection and can also provide multi-axis sensing from one sensor element.

The diameter of the drum 5 may be reduced in order to provide higher resolution.

The switch 14 can be a simple on-off limit switch and may be electrical, pneumatic or electronic. It may alternatively be a friction-less magnetic, capacitive, light-sensitive or ultrasonic sensing type switch.

The sensor can alternatively be an analogue type using an encoder disc in place of the cam segments. Similarly, a pneumatic analogue signal may be achieved by a rotating disc designed to restrict or increase air flow.

The resin mix flow delivery system can be so arranged that, when it receives a sensor signal, the flow of the resin mix is stopped until the mould deflection returns to a safe level. Alternatively, the flow output is reduced to an optimum level through a standard PID control loop.

In the specific arrangement shown in FIGS. 1, 2A and 2B, the sensor system is arranged to sense deflection or distortion of the inner mould element 1. It will, of course be appreciated that a similar arrangement may be used to sense deflection or distortion of the outer mould element. In such case, the mould element will deflect outwardly to increase the length of the sensor lead. This provides a readily available movement from which the necessary sensor actuation can be derived.

Figure 3:
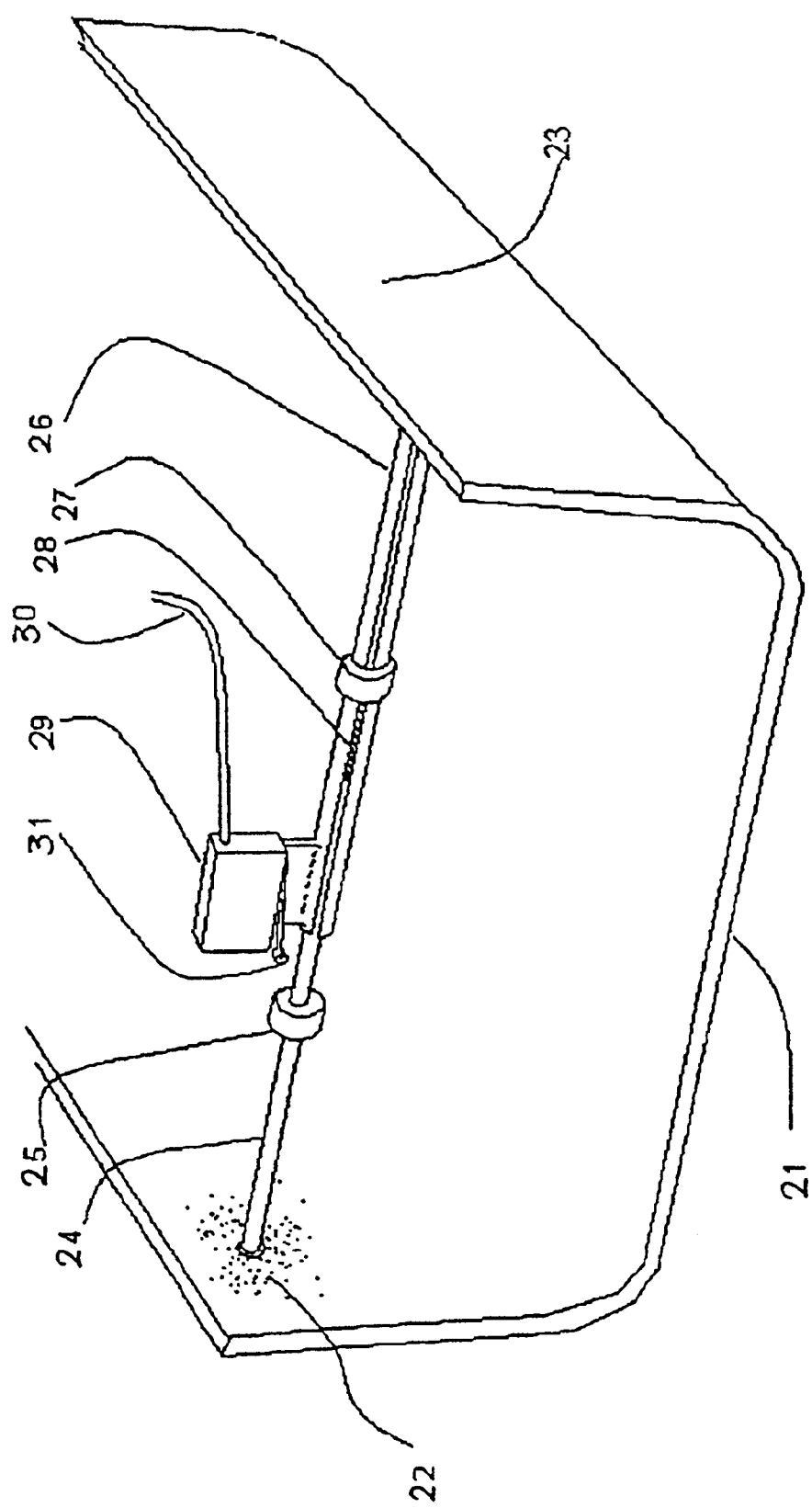
FIG. 3 is a diagrammatic perspective view of an inner mould element fitted with a second form of sensor system.
Figure 4:
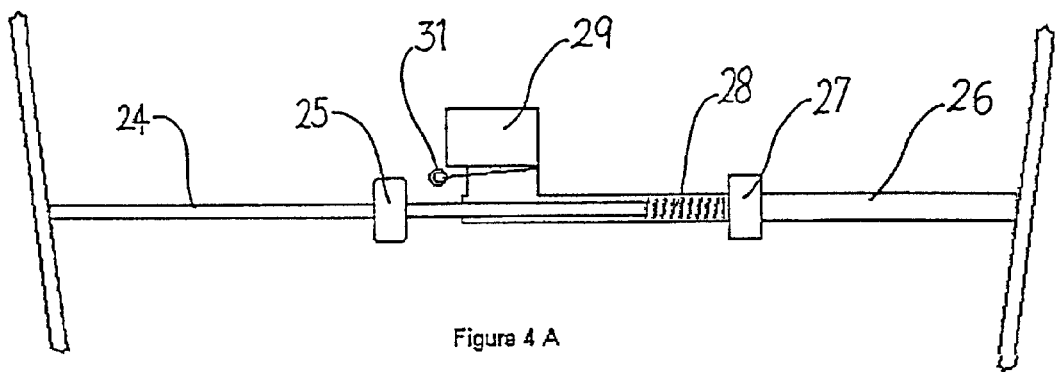
FIG. 4A shows the sensor system of FIG. 3 with the inner mould element in an undeflected condition.
FIG. 4B shows the sensor system of FIG. 3 with the inner mould element in a deflected condition.
Figure 4B:
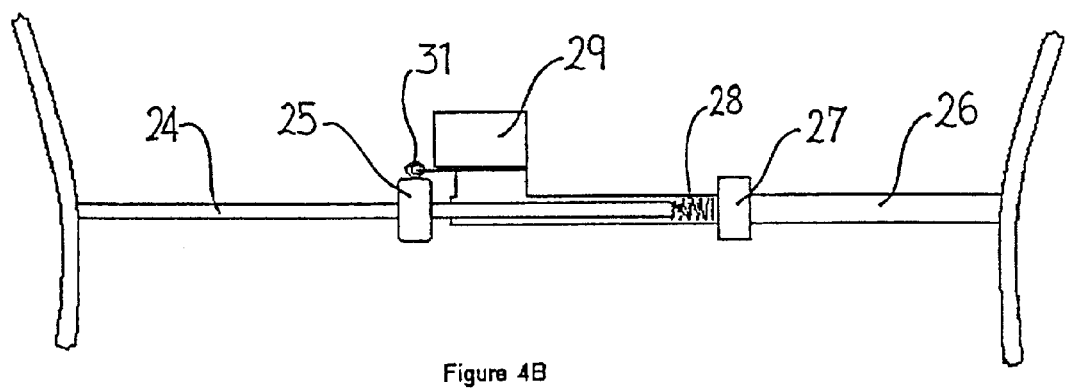

Turning next to FIGS. 3, 4A and 4B, these show an inner mould element 21 having a moulding surface 23 which represents the inner surface half of a matched mould pair.

A spring-loaded telescopic shaft comprising a pole 24 and a slotted outer tube 26 extend between a pair of anchor points 22 on the inner mould element 21. A spring 28 acts between the free end of the pole 24 and an adjustable locking collar 27 carried by the slotted outer tube so that the spring-loaded telescopic shaft 24/26 is maintained in tension between the two anchor points 22.

The length of the telescopic shaft 24/26 is adjusted so that it fits between the two inner mould walls, as shown in the drawings, and the locking collar 27 is so positioned that a small degree of positive spring lengthening tension is provided. The locking collar 27 includes a part which projects through the slot in the tube 26 to provide a reaction surface for the spring 28.

A cam 25 is mounted on the pole 24 and can be set in a desired adjusted position along the length of the pole 24. A switch 29 is mounted on the outer end of the slotted tube 26. The switch 29 has an output lead 30 and a lever 31 positioned for engagement with the cam 25.

In operation, once the spring-loaded telescopic shaft 24/26 has been fitted between the opposing mould walls, the position of the cam 25 is adjusted so that it is in close proximity to the end of the lever 31 of switch 29. The cam 25 is then locked in position and the condition shown in FIG. 4A is obtained.

The resin mix is then introduced into the mould cavity and a composite moulding is produced as described above. FIG. 4B illustrates the result of inward deflection of the mould walls. The inward distortion of the mould walls shortens the spring-loaded telescopic shaft 24/26 by compressing the spring 28. As the shortening action progresses, the cam 25 moves towards and actuates the switch lever 31 to generate a signal to indicate that a predetermined degree of mould distortion has been detected. The control system then responds to this signal as described above.

Again, any type of linear switching device can be used to provide the output signal in either a digital or an analogue format, i.e. the signal which is generated may depend on the degree of distortion of the mould walls. The arrangement may thus be such that a reading can be obtained indicative of the amount of mould wall distortion which has been produced during feeding of the resin mix into the mould cavity.

What is claimed is:

1. A method of making a composite moulding which includes:
   providing a pair of mould elements which define a mould cavity, at least one of which mould elements includes a deformable portion, introducing reinforcing fibre into the mould cavity, feeding a resin mix into the mould cavity, providing means for sensing distortion of said deformable portion of said at least one mould element and generating an output signal when a predetermined degree of distortion is sensed, said sensing means including a lead attached to an anchor point on the at least one mould element and spring means acting on the lead, and controlling the rate at which the resin mix is introduced into the mould cavity in dependence on said output signal.

2. A composite closed mould production facility which includes:

a pair of mould elements which define a mould cavity into which reinforcing fibre can be introduced, means for feeding a resin mix into the mould cavity, means for sensing distortion of a mould element, said sensing means including a lead attached to an anchor point on the mould element and spring means acting on the lead, means for generating an output signal when a predetermined degree of distortion is sensed, and control means for controlling the rate at which the resin mix is introduced into the mould cavity in dependence on said output signal.

3. A composite closed mould production facility as claimed in claim 2, in which the lead is connected to a drum carrying cam segments arranged for engagement with a switch operating member.

4. A composite closed mould production facility which includes:

a pair of mould elements which define a mould cavity into which reinforcing fibre can be introduced, means for feeding a resin mix into the mould cavity, means for sensing distortion of a mould element, means for generating an output signal when a predetermined degree of distortion is sensed, and control means for controlling the rate at which the resin mix is introduced into the mould cavity in dependence on said output signal, and in which the means for sensing distortion of the mould element includes a spring-loaded telescopic shaft extending between two walls of the mould element.

* * * * *